Aug. 27, 1963   J. H. BURNETT   3,102,223
HALF FREQUENCY POWER SUPPLY FOR VIBRATING MACHINES
Filed July 5, 1960   5 Sheets-Sheet 1

INVENTOR.
J. H. BURNETT
BY
HIS ATTORNEY

Aug. 27, 1963   J. H. BURNETT   3,102,223
HALF FREQUENCY POWER SUPPLY FOR VIBRATING MACHINES
Filed July 5, 1960   5 Sheets-Sheet 2

INVENTOR.
J. H. BURNETT
BY
HIS ATTORNEY

Aug. 27, 1963   J. H. BURNETT   3,102,223
HALF FREQUENCY POWER SUPPLY FOR VIBRATING MACHINES
Filed July 5, 1960   5 Sheets-Sheet 3
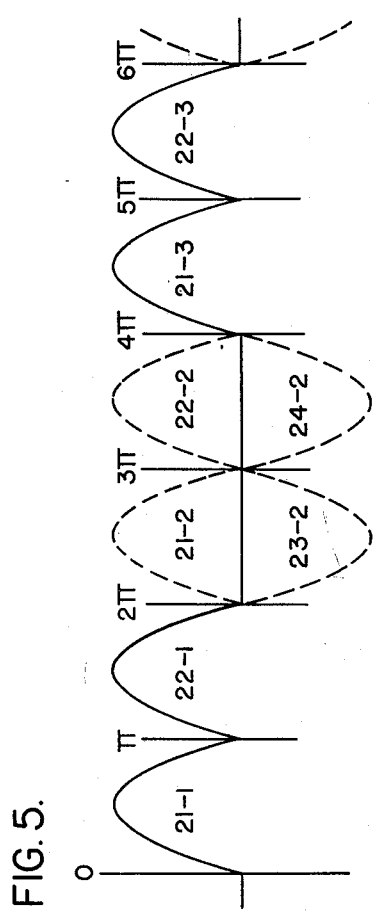
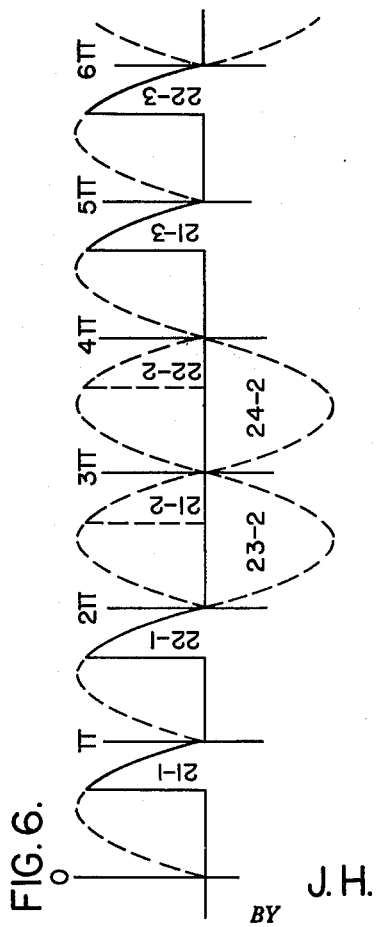
INVENTOR.
J. H. BURNETT
BY
HIS ATTORNEY Aug. 27, 1963  J. H. BURNETT  3,102,223
HALF FREQUENCY POWER SUPPLY FOR VIBRATING MACHINES
Filed July 5, 1960  5 Sheets-Sheet 4
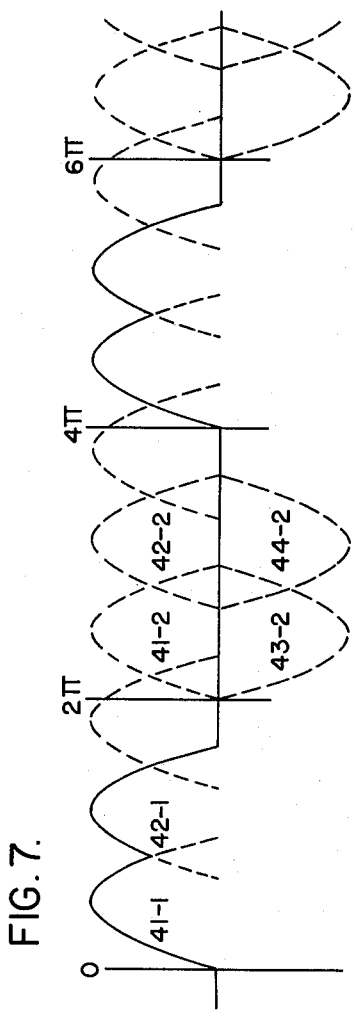
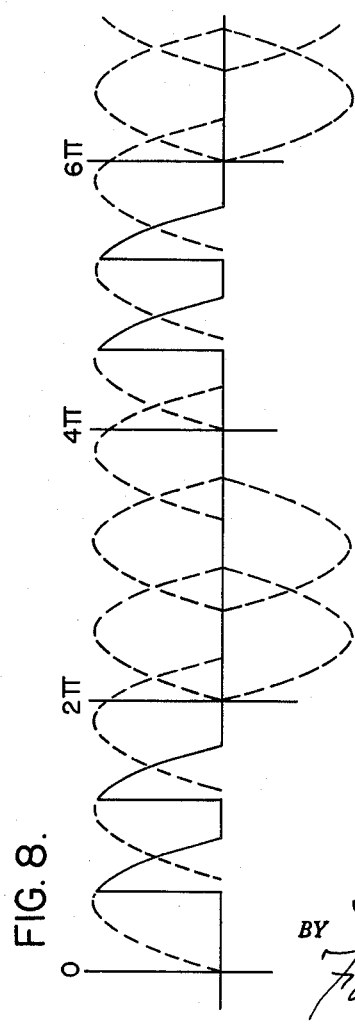
INVENTOR.
J. H. BURNETT
BY
HIS ATTORNEY Aug. 27, 1963   J. H. BURNETT   3,102,223
HALF FREQUENCY POWER SUPPLY FOR VIBRATING MACHINES
Filed July 5, 1960   5 Sheets-Sheet 5
FIG. 9A.   GATING CIRCUIT
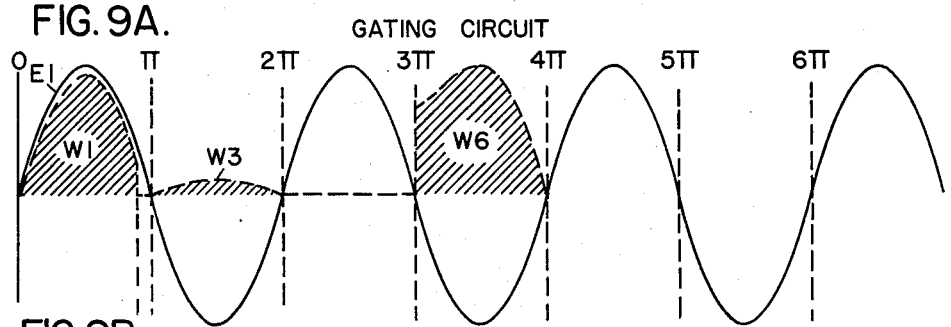
FIG. 9B.   CONTROL CIRCUIT
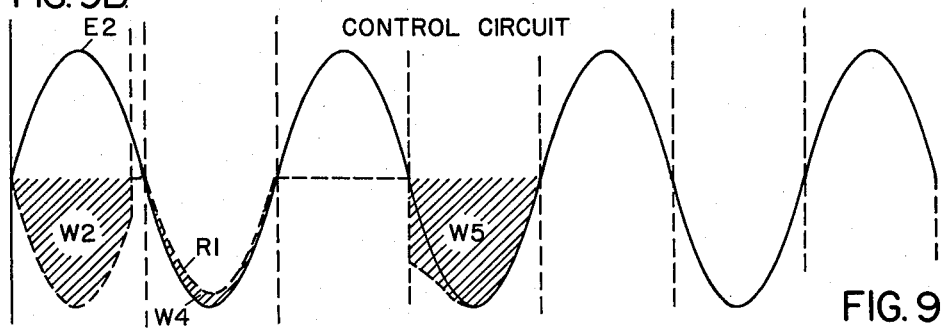
FIG. 9C.   CORE FLUX
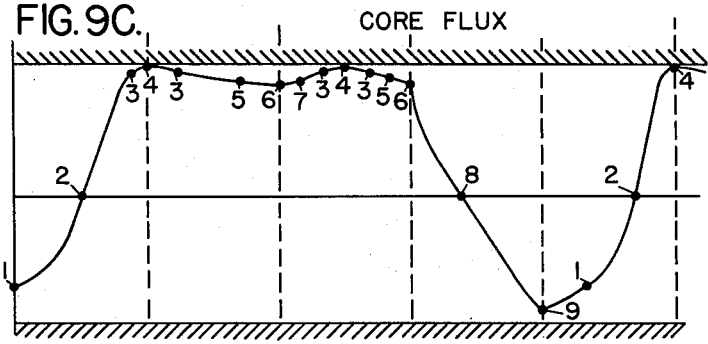
FIG. 9D.
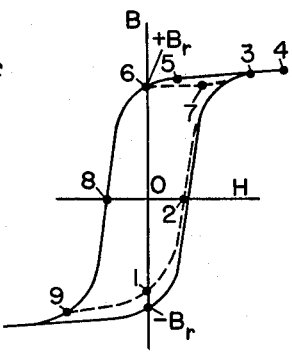
FIG. 9E.   OUTPUT CURRENT
FIG. 9F.   CAPACITOR VOLTAGE
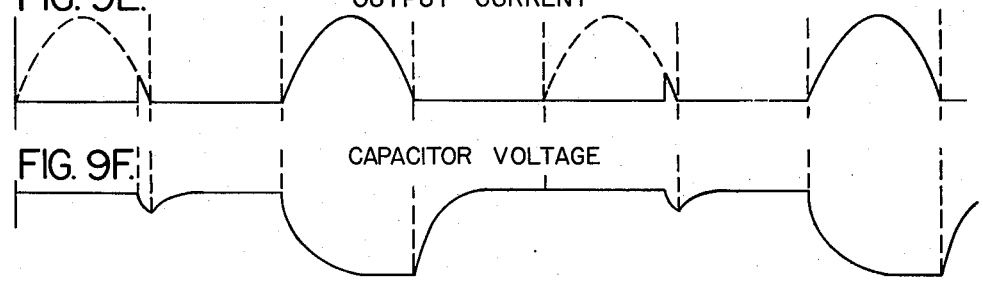
INVENTOR.
J. H. BURNETT
BY
HIS ATTORNEY

United States Patent Office 3,102,223
Patented Aug. 27, 1963

3,102,223
HALF FREQUENCY POWER SUPPLY FOR VIBRATING MACHINES
James H. Burnett, Pasadena, Calif., assignor to Electrons, Incorporated, Newark, N.J.
Filed July 5, 1960, Ser. No. 40,929
13 Claims. (Cl. 321—38)

This invention relates to a half frequency conversion means operable from a single or multiphase source of power.

More specifically, whenever vibratory loads are encountered which are operable at half the frequency of the supply frequency the disclosure herein presented will readily serve to convert the supply frequency of alternating voltage to a pulsating voltage at half the frequency of the supply voltage. The power requirement of the load is limited only by the power handling capability of the rectifying units which may be paralleled when high load requirements are desired. In instances where it is advantageous to provide apparatus which is shock proof the rectifying units may be transistorized, thereby eliminating all vacuum or gas filled tubes which are subject to shock conditions.

Heretofore, when an equivalent result as produced by the disclosed equipment was desired, it was necessary to drive a half frequency generator by a motor from the power source and then half-wave rectify the output from the generator. This invention eliminates the need for such heavy, bulky equipment where such frequency conversion is essential.

In general the operation of the circuit depends upon the time of firing of the thyratrons or other rectifying devices within any half cycle period to provide a stepless control of the output voltage, and also depends upon the phase relationship of various control voltages to govern the start of these half cycle periods. One set of saturable reactors, having a means for controlling the output voltage, gates the rectifying devices at any desired time within a half cycle period, and another set of saturable reactors, having a feedback circuit, is capable of eliminating alternate half cycle pulses of a definite polarity. By combining these effects in a full-wave rectifying circuit, it is possible to produce a unipolar pulse of energy on every alternate cycle of the input frequency, thereby providing a voltage at half the frequecny of the source voltage. Such half frequency voltages are beneficial for operating vibrating machinery whose mass is at times too great to be operated satisfactorily at the line frequency.

One object of this invention is to provide a means for obtaining a half frequency voltage without the use of rotating machinery.

Another object is to provide a gating device for a rectifier which is responsive on alternate half cycles only.

Another object is to provide a circuit combination of saturable reactors and rectifiers so that half frequency voltages will result for driving vibrating mechanisms.

Another object is to provide a circuit arrangement of saturable reactors and rectifiers for use in a polyphase circuit so that half frequency voltage output will be effective to drive vibrating mechanisms.

Other objects, purposes and characteristic features of this invention will be in part obvious from the accompanying drawings and in part pointed out as the description of the invention progresses.

In describing the invention in detail reference will be made to the accompanying drawings in which like reference characters designate corresponding parts throughout the several views. Also the several views have been given titles for the purpose of more readily identifying them, and the major components within each drawing have been given labels for ready identification. A brief description of the several views included for an easy understanding of this invention is as follows:

FIG. 5 is the voltage output waveform developed across the load in the circuit of FIG. 1 at maximum power output;

FIG. 6 is the voltage waveform developed across the load of FIG. 1 at partial output;

FIG. 7 is the voltage waveform developed across the load in the circuit of FIG. 2 at maximum power output;

FIG. 8 is the voltage waveform developed across the load in FIG. 2 at partial output; and FIGS. 9A, 9B, 9C, 9D, 9E and 9F are a group of waveforms and characteristics for the typical operation of the reset magnetic amplifier with feedback whose circuit is shown in FIG. 4.

Figure 1:
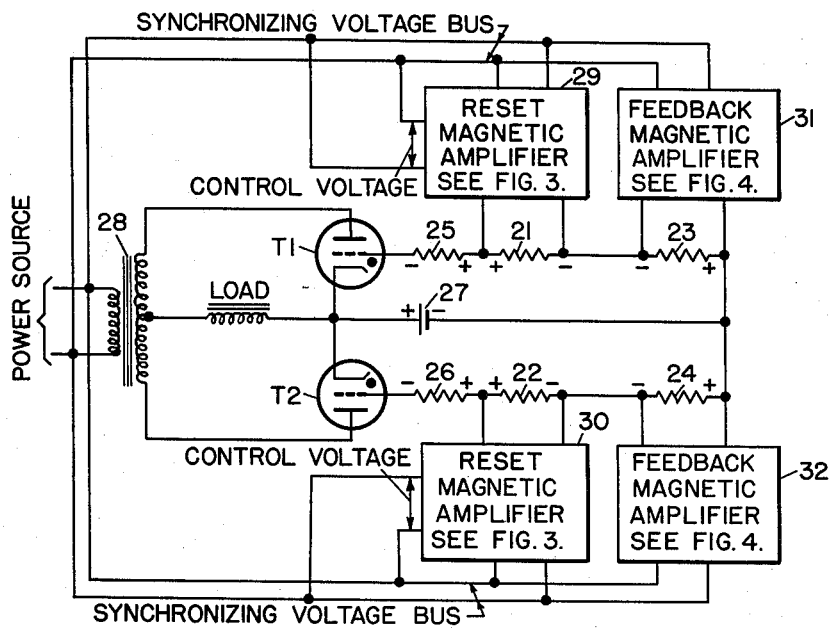
FIG. 1 is a circuit arrangement operable from a single phase source of power and having full-wave rectification each controlled by a reset magnetic amplifier and a reset magnetic amplifier with feedback.

The apparatus involved in these circiuts is all standard except for the magnetic amplifiers which will now be discusesd in general and later discussed in detail insofar as their function is concerned.

Magnetic amplifiers are sometimes called transductors or saturable reactors and considerable technical literature is available on these devices. The magnetic amplifier along with the transistor and ferro-electric amplifier is considered an electronic device. In certain applications there are many advantages which make the use of the magnetic amplifier preferable to a vacuum tube or gas filled tube, since both of the latter are subject to shock and vibration. The magnetic amplifier is particularly useful because of its high power handling ability, reasonable cost, and extreme ruggedness. Because of this latter characteristic the military personnel have designed many magnetic amplifiers into their equipments where shock hazard is extreme. Another advantage of these units is that the power output is instantly available, since it requires no filament power, and hence no cathode warm-up time. Another advantage of these devices is that once the components have been selected for inclusion into some magnetic amplifier circuit, no other precision constructional techniques are necessary to assemble the arrangement. One final advantage of the magnetic amplifier is its relatively stable characteristic with respect to temperature changes compared to transistors or ferro-electric amplifiers.

The specific type of amplifier with which we are here concerned is a voltage sensitive device since it is controlled by a voltage rather than a current, and furthermore, it does not require a change of magnetization while the transformer winding is drawing current. Robert A. Ramey of the Naval Research Laboratories presented a paper on this type of amplifier at the A.I.E.E. Summer General Meeting in Toronto, Canada in June of 1951. This type of magnetic amplifier does not change flux level when the output circuit is carrying current during a half cycle period, but cuts off the current during alternate half cycles in order to reset the flux level to the desired starting point. During the alternate half cycles current gating is accomplished and will flow in the output circuit after the saturable magnetic core reaches its saturation point at some time within the half cycle period and for the duration of this same period. This gating current is used to establish a bias voltage across an output load resistor, which, in turn, controls the firing of a thyratron or other gatable rectifier. A magnetic amplifier used in this connection was described in the proceedings of the Institute of Radio Engineers, vol. 44, No. 4, dated April 1956, page 529 to 532, the title of which was "A Magnetic Thyratron Grid Control Circuit" by J. H. Burnett.

The other magnetic amplifier with which we are concerned in this invention is of the same general type as the above except that a feedback circuit is added. Since the feedback voltage is aiding the normal control voltage, it is therefore referred to as possessing positive feedback. This feedback could possibly be obtained by several different means, but in this instance the storage characteristic of a capacitor is used to maintain the feedback voltage.

Each of the above two types of magnetic amplifiers make use of a ferro-magnetic core having a BH characteristic which is essentially in the form of a parallelogram.

*Operation of the Reset Magnetic Amplifier With Positive Feedback*

Figure 4:
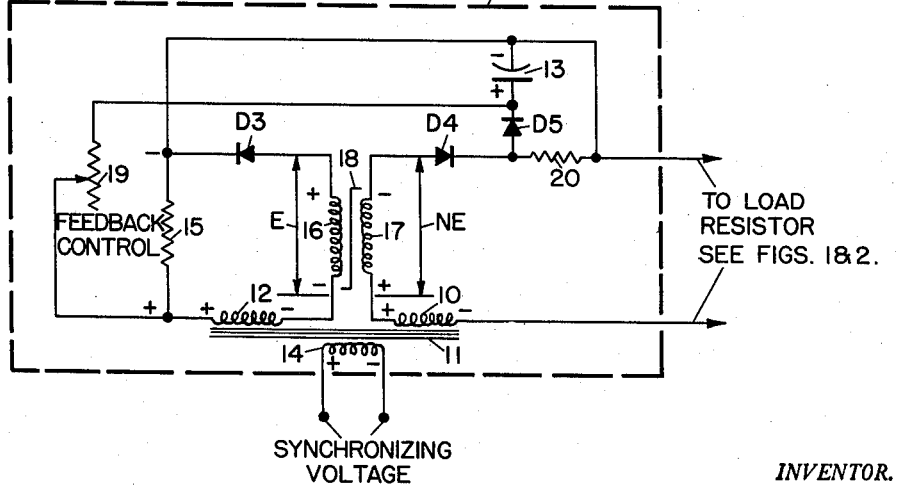
FIG. 4 is a detailed circuit arrangement of a reset magnetic amplifier with positive feedback.

By referring to FIGS. 9A to 9F in conjunction with the following explanation one should readily be able to understand all of the functions which occur within each portion of the circuit of FIG. 4 during each half cycle interval. In the following discussion we will consider each half cycle period at a time, and follow the effect of all voltages, fluxes, and currents throughout the circuit.

In FIG. 9A the applied sine wave voltage is shown as E1 by a solid normal weight line. This voltage is developed across one secondary winding 10 of the synchronizing voltage transformer 11. This secondary winding is in the output circuit, or what is normally referred to as the gating side of the magnetic amplifier. The polarities of the windings during the first positive going pulse are indicated on the drawing of FIG. 4. The other secondary winding 12 of this same transformer 11 appears in the primary or control circuit, where it will be noted certain polarities also exist. In other words, this secondary voltage E2 is in phase with the other applied voltage E1 in the gating circuit, and consequently is represented in this manner in FIG. 9B. Let us now make several assumptions in order to arrive at a starting point in describing the operation of this circuit. First of all, the hysteresis or BH curve is of the general shape as shown in FIG. 9D. Since it is desirous to obtain complete half-wave rectified pulses every 1/30 of a second, it is necessary to draw no current during alternate positive periods of the applied voltage frequency and maximum current during the other alternate positive periods. In order to show this more clearly a very small current is shown as flowing in the output circuit during alternate half cycle positive periods and is typically shown by the waveform of FIG. 9E. This low current approaches the zero current condition and under ideal conditions zero current would flow at this time, but for the purposes of explanation a small current is represented. The starting point on the BH curve, then, must be so chosen as to take advantage of nearly full swing of the BH characteristic. For this reason, point 1 on the BH curve was arbitrarily selected at which point the core material resides near the −B$_r$ remanence point. Another assumption which is required in this circuit is the condition of the capacitor 13 at time zero or the extreme left side of the waveform chart. We will assume that this capacitor 13 is completely discharged. The primary winding 14 of the transformer 11 is connected across a source of A.C. voltage to maintain synchronism with other apparatus in the circuit.

The curve represented in FIG. 9C shows the condition of the core flux at any time corresponding to the waveforms above or below it. Each point on the BH characteristic FIG. 9D has a corresponding point on the core flux curve FIG. 9C. Starting at point 1 on the BH characteristic we will proceed through point 2 to the saturation point 3, and similarly these same points will be traversed on the core flux curve. In the circuit of FIG. 4 a voltage NE appearing across the secondary winding 17 of the saturable reactor 18 during this time is effective to add sufficient flux to the core material to carry us to point 3 on the BH curve. This volt-second area is shown as W1 in FIG. 9A and is equivalent to the number of webers required to produce this flux for this portion of the cycle up to the time when output current flows. This quantity of webers is reflected into the primary winding in an opposite sense or 180° out of phase as shown by the area W2 in FIG. 9B when the winding polarities are physically as represented by the positive and negative markings near the ends of the windings as shown in FIG. 4. Just as in the operation of the simple magnetic amplifier circuit of FIG. 3 having no feedback, when saturation flux is reached, a current will be conducted around the gating circuit loop is a clockwise direction. In this instance a very small current is shown near the end of the first half cycle merely to indicate that this function is essentially the same as for the simple magnetic amplifier without feedback. It is understood that this point may vary in time anywhere from zero to 180°. This slight current near the end of the first half cycle as shown in FIG. 9E may readily flow through diode D5 charging the capacitor 13 and continuing through resistor 23 or 24 whichever is applicable. These load resistors are shown in the circuit of FIG. 1. The small charge developed across the capacitor 13 is shown in a negative sense in FIG. 9F inasmuch as a charge in this direction will add to another negative-going pulse as will be described later. The additional time during which this positive-going pulse is effective will carry us to point 4 on the BH curve and similarly to the same point on the flux curve of FIG. 9C.

Proceeding now to the negative second half cycle the polarities on each of the secondary windings in the transformer 11 will now be reversed. A polarity in this direction will produce no current in the secondary or gating loop because it is contrary to the polarity of the diode D4 in this circuit. On the primary or control side of the amplifier, however, this change in polarity will produce a counterclockwise current through diode D3 and provide a voltage drop across the resistor 15. Nearly all of the voltage appears across this resistor 15 because the core is now saturated and consequently the impedance of the primary winding 16 is very low or may be essentially considered as a short circuit. The current magnitude may be considered as being limited only by the value of the resistor 15. The voltage drop around this circuit must be equal to the applied voltage, and although, as we stated before, the drop across the primary winding is essentially zero, it may not necessarily be quite zero but a very small amount. If we assume a small voltage appears across this primary winding throughout this negative pulse period, then the area developed between the E2 curve and the resistance 15 multiplied by this primary current curve as shown in FIG. 9B will represent the number of webers W4 produced in the negative direction by this voltage. This is shown because we have a semi-idealized or more realistic BH characteristic curve for the core material, consequently some negative flux is required in progressing from point 4 on the curve of FIG. 9C to point 6. This drop in flux is shown as time progresses in FIG. 9C while advancing through points 4, 3, 5 and 6 on the BH curve of FIG. 9D. At this time, then, we may say that the core is still positively saturated in preparation for an output current pulse over the complete next half cycle. The area W3 in FIG. 9A is representative of the number of webers reflected into the secondary winding 17 in the positive sense or opposite to W4, and is therefore shown on the positive side of the zero reference line.

At the start of the third half cycle of the applied voltage E1 which is again positive, the core is now saturated, the secondary winding 17 may also be considered as short circuited, and consequently a current will flow around the loop through diodes D4 and D5 charging the capacitor 13 in the polarity indicated and returning through resistor 23. For ease of explantaion at this time we will drop the other half of the circuit of FIG. 1 in which resistor 24 could also be the output resistor for the circuit of FIG. 4, but it must be understood that either resistor 23 or 24 may be the load applied to this circuit. Now that the core has been saturated, a high current output pulse will flow at this time, and is shown as such in the waveform of FIG. 9E during this period between 2 pi and 3 pi. At the same time as stated above, a charging voltage waveform for the capacitor 13 is shown in FIG. 9F. A small portion of this current will further attempt to magnetize the core and consequently a loop will be formed through points 6, 7, 3, 4, 3, 5 to 6 on the BH curve of FIG. 9D and this variation in flux is shown through the same points during this period in FIG. 9C. If we consider that the magnetizing current alone during this period produces the flux change then no amount of webers is responsible for this change. Some slight amount will occur as a secondary effect, however, although none are shown in either curve of FIG. 9A or 9B.

During the fourth half cycle period it is now necessary to reset the core back to point 1 where we previously started at the beginning at the first half cycle. From the BH characteristic FIG. 9D it can be seen that the distance from point 6 to point 9 in a vertical direction involving only the amount of flux is somewhat greater than proceeding in the opposite direction from point 1 to point 4. This is true because of the shape of the minor saturation loop 9, 1, 2, 3, 6, 8 to 9. In order to overcome this additional flux, it is necessary to provide additional voltage to drive the core to the reverse flux position 9 so that it may proceed in a positive direction along the same line of the original minor loop and thereby pass through point 1. The capacitor 13 and the feedback network provide this additional voltage means at the end of the third half cycle. Since the capacitor 13 retains a charge it is effective to add to the voltage in the same direction as that now appearing across the secondary winding 12 of transformer 11 (voltage E1). It may now be considered that the voltage appearing across resistor 15 is acting as a generator aiding the voltage appearing across the secondary winding 12, therefore these voltages are additive during this period of time throughout this half cycle period, and are effective to produce a quantity of webers marked as W5 in FIG. 9B. It will be noted that this area exceeds the area under the half cycle pulse of the sine wave E2 which is the exact result desired during this period. The voltage on the capacitor 13 will discharge depending on the time constant of the combination of the size of the capacitor 13 and whatever portion of the resistor 19 and 15 is in the circuit. We will assume that this time constant is relatively short so that the capacitor 13 is discharged completely before the start of the next half cycle. The area W6 is representative of the reflected quantity of webers into the secondary side, but in this case this developed voltage merely counteracts the voltage appearing across winding 10 in the gating circuit except for the slight excess which appears at the very start of this half cycle period. This excess may be sufficient to recharge the capacitor 13 to a minor degree, but any such charge would readily be dissipated before the end of this half cycle period through the feedback network including resistors 15 and 19. The progress of the flux during this period may readily be followed by referring to the curve of FIG. 9C. It will be noted that point 9 now occurs at the end of the fourth half cycle period, whereas we initially started the first half cycle at point 1. This simply means that during steady state operation the flux curve of FIG. 9C will be slightly steeper because its bottom end is shifted somewhat to the right at the start of the fifth half cycle period. This does not necessarily mean that our starting point was inaccurate, but rather that this change actually occurs under the conditions represented, inasmuch as some arbitrary point of zero magnetizing force was established as point 1 with no applied voltages. One can readily understand that in order to repeat the same series of events, it will be necessary to repeat the passage through point 1 on the BH characteristic of FIG. 9D.

To summarize, this circuit will provide unidirectional alternate half cycle pulses of an applied voltage waveform of any desired input frequency up to several megacycles depending on the selection of components. The circuit arrangement of FIG. 4 may be referred to as a skip-cycle circuit because it "skips" or nullifies the alternate unidirectional half cycle pulses with respect to those provided as referred to above. This circuit might well be considered as a half frequency converter and rectifier combination supplying in the output only one-quarter of the volt-time waveform of the input frequency.

*Operation of the Single Phrase Power Supply*

It would appear at first glance that the operation of the circuit shown in FIG. 1 is a standard full wave rectifier, and this, in one sense is true, inasmuch as the input transformer 28 secondary winding has a tap at its midpoint, consequently, if we assume that a positive-going voltage first appears across thyratron T1 during the first half cycle and across thyratron T2 during the second half of the input cycle, we can readily recognize the normal circuit arrangement for a full wave rectifier with respect to the input frequency. Contrary to this first glance, however, the outcome of this analysis will show that the waveform of the voltage developed across the load is a group of rectified pulses which appear every 1/30 of a second when the source frequency is 60 cycles per second. This 30 cycle output pulse train of voltages applied to the load is shown in FIG. 5 under maximum output conditions, and in FIG. 6 under partial output conditions. Inasmuch as this pulse train is existent or is "turned on" essentially between 0 and 2 pi and is non-existent or "turned off" essentially between 2 pi and 4 pi as viewed from the load, the supply which therefore feeds the load is merely a half wave rectified double or multiple pulse of energy occurring every 1/30 of a second. The full development of this pulse train will be explained at a later time when we consider in detail the development of the waveforms shown in FIGS. 5 and 6.

Referring back to FIG. 1 it will be noted that a bias voltage 27 is inserted in the circuit to maintain each of the thyratron grids at some negative potential below their critical firing voltage under the conditions when all other voltages in the grid circuit are zero. The resistors 25 and 26 are inserted in each of the respective grid circuits of T1 and T2 to limit any current surges which may randomly occur during periods of grid conduction. The voltage which controls the firing of thyratron T1 is the summation of the voltages which appear across resistors 21 and 23 in series and the bias maintained by the battery 27. Similarly, the grid of thyratron T2 is controlled by the voltages which appear across the resistors 22 and 24 in series plus the bias supplied by battery 27. In the existing literature the authors have shown how voltages are developed across the output resistors 21 and 22 of the reset magnetic amplifiers 29 and 30 and in the previous discussion on the feedback magnetic amplifier we have shown how the voltage is developed across the load resistors 23 and 24 for the feedback magnetic amplifiers 31 and 32. Now let us assume that the voltage developed across resistor 21 is a positively polarized half wave rectified pulse of a sine wave which occurs at all even numbered pi phases, that is, starting at time zero, 2 pi, 4 pi, 6 pi, etc. Similarly, we will assume that a positively polarized half wave rectified pulse of the same magnitude of sine wave will occur across the resistor 22 at the odd numbered pi phase times, such as at pi, 3 pi, 5 pi, 7 pi, etc. Let us also assume that the output voltage occurring across resistors 23 and 24 will be similar pulses except that they will be of a polarity reverse to that of those appearing across resistors 21 and 22. It will be noted that the circuit diagram of FIG. 1 contains polarity markings to cover the above conditions. Another way of saying this is that the voltages appearing across resistors 23 and 24 are in opposition to those appearing across resistors 21 and 22. We have shown in the former discussion concerning the feedback magnetic amplifier that it produces what is termed "skip period" pulses. Whenever the skip period occurs no voltage will be developed across the output resistors 23 and 24, consequently resistors 21 and 22 alone influence the bias on the grids of thyratrons T1 and T2 respectively (the current limiting resistors 25 and 26 are disregarded for purposes of simplification in this discussion since their function serves another purpose). Contrawise, whenever the skip period is absent, or when a voltage pulse appears across resistors 23 and 24, it is in opposition to the voltage pulses appearing across resistors 21 and 22 respectively, therefore a cancellation results. By referring to the waveform of FIG. 5 we will show how this waveform is developed.

Turning to FIG. 5 waveform it will be noted that numbers appear within each of the half cycle pulses. The first portion of the number represents the resistor across which the pulse is formed and the second portion of the number represents the sequence in which these pulses are formed starting at time zero with respect to each resistor. If we assume at time zero that the feedback magnetic amplifier resistor 23 is not producing any pulse, then the only pulse in existence is 21–1, which therefore biases the thyratron T1 into conduction at this time. When this occurs this same voltage waveform will be presented across the load, provided that proper synchronization is arranged between the positive-going pulse within the transformer 28 and this keyed voltage pulse appearing at the grid of thyratron T1. This is accomplished by making the proper connections from the reset magnetic amplifier to the synchronizing voltage bus. Since as stated before, we have full wave rectification of the input frequency, the next pulse which will appear between pi and 2 pi is 22–1 because there is no opposing pulse to cancel it at this time. Now that we have completed a skip cycle, pulses will effectively appear across the feedback magnetic amplifiers 31 and 32 output load resistors 23 and 24 respectively which are represented as 23–2 and 24–2 within the next cycle. These pulses are effective to cancel the pulses 21–2 and 22–2 since they are equal in amplitude and shape and opposite in polarity, therefore no output results during this cycle, which is shown by the straight solid line on the reference base. At the start of the 4 pi period the pulses repeat just as during the first cycle and at the start of the 6 pi period they repeat just as they did at the start of the 2 pi period. As a consequence of this occurrence of events, a 30 cycle half wave group of voltage pulses have been developed for application to the load.

It will be noted in FIG. 1 that another pair of wires is designated as control voltage for the reset magnetic amplifiers 29 and 30. In this figure this voltage is taken from the synchronizing bus, and the potentiometer 40 (see FIG. 3) within the reset magnetic amplifier is used to control the level of power output by applying some portion of this voltage to the primary side of the magnetic amplifier. This voltage may be a D.C. voltage as well as an A.C. voltage, since either will govern the number of webers required to produce reset in the core of the magnetic amplifier.

The reduced output voltage from the reset magnetic amplifiers 29 and 30 may be properly termed proportional stepless control, inasmuch as it is smooth acting within any half cycle period. This smooth acting control of the thyratron grids is passed on to the load current which may similarly be controlled smoothly in average amplitude. In other words, the load may be operated from a "full on" condition to a "full off" condition in a stepless manner without the use of any type of step function control.

Figure 3:
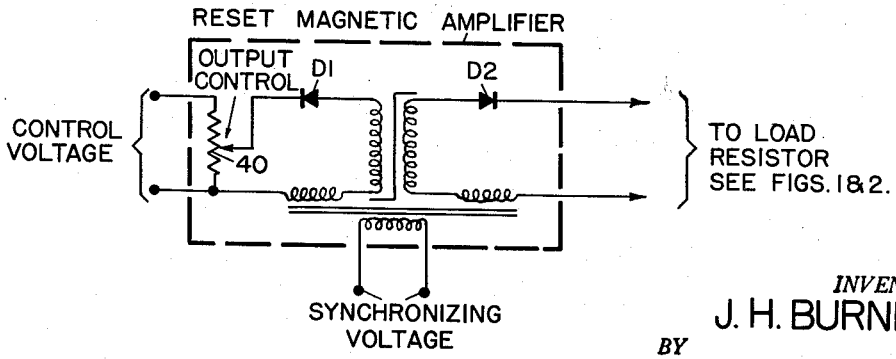
FIG. 3 is a detailed circuit arrangement of a reset magnetic amplifier.

It will be noted that the waveforms of FIG. 6 are very similar to those of FIG. 5 except that portions of the pulses starting with numbers 21–1 and 22–1 are "chopped out" or eliminated during the first portion of their respective half cycles. The output control 40 in the reset magnetic amplifier of FIG. 3 is effective to control the time within the half cycle period where the output voltage pulse is initiated. In order to develop the waveform of FIG. 6 in the manner illustrated, so that the output voltage pulse appearing between times zero and pi and pi and 2 pi would be nearly identical, it would be necessary to gang the two controls 40 in each of the respective reset magnetic amplifiers 29 and 30. Although this is not essential in producing a 30 cycle pulse of energy, it may, in some instances, be desirable to maintain each of the magnetic amplifiers 29 and 30 at a relatively constant level with respect to each other. The operation within the second cycle of FIG. 6 is somewhat different because the entire pulse 23–2 and 24–2 appears across the respective load resistors 23 and 24 for the outputs of the feedback magnetic amplifiers 31 and 32. These negative pulses, shown as dashed lines, appearing at this time will produce no effect on the thyratrons T1 and T2 except to keep them in a state of nonconduction. The dotted pulses 21–2 and 22–2 appear as before across their respective load resistors 21 and 22. A cancellation of these pulses will result, then, only during the time when they exist, namely during the latter portion of each half cycle. The waveform, therefore, appearing across the load will still be represented by the solid line shown in FIG. 6.

This general circuit of FIG. 1 need not necessarily be confined to the use of thyratron tubes. The choice of these gating devices may depend on the economics, the use which will be made of the equipment, on the frequencies involved, and the load current requirements. As stated previously gatable transistor rectifiers would be the most desirable choice whenever shock or vibration hazards are encountered.

*Operation of a Three Phase Power Supply*

Figure 2:
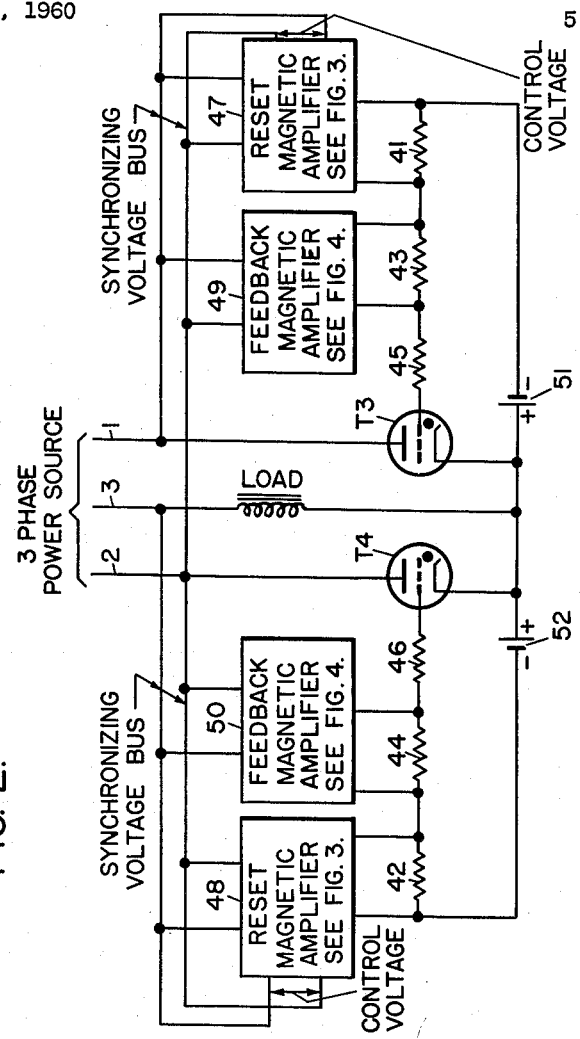
FIG. 2 is a circuit arrangement operable from a three phase source of power having a rectifying means in two of the three phases and each rectifier controlled by a reset magnetic amplifier and a reset magnetic amplifier with feedback.

Another variation using magnetic amplifiers to control the gatable rectifiers could be used to operate from a three phase power source as shown in the circuit arrangement of FIG. 2. It will be noted that no input transformers is required in this circuit to supply the thyratron voltages, which may be of some economic advantage. It should further be noted that phase 1 is associated with thyratron T3 and its grid control circuit involving resistors 41 and 43 which are fed respectively from the output of magnetic amplifiers 47 and 49. Here again the resistors 45 and 46 are inserted in the grid circuits to limit any randomly occurring pulses which may influence these grids in an adverse manner. Phase 2 similarly supplies thyratron T4 and its associated grid circuit involving resistors 42 and 44 which are respectively fed by magnetic amplifiers 48 and 50. It should also be noted that batteries 51 and 52 are inserted in the phase 1 and 2 grid circuits separately for biasing the respective grids when no voltage appears across the load resistors of the magnetic amplifiers. Each of these grid circuits is controlled by a reset magnetic amplifier 47 and 48 and a feedback magnetic amplifier 49 and 50 respectively. For further clarification it should be pointed out at this time that for a delta connection phase 1 would exist between wires 1 and 2 and phase 2 would exist between wires 2 and 3. It is necessary for proper synchronization to have the inputs of magnetic amplifiers 47 and 49 referenced to phase 1 or applied across the synchronizing voltage bus which in turn connects to lines 1 and 2. Similarly it is also necessary to have the inputs to magnetic amplifiers 48 and 50 synchronized with phase 2 and therefore connected across this synchronizing voltage bus which connects to lines 2 and 3. If the control voltage is assumed to be an alternating voltage each of the reset magnetic amplifiers 47 and 48 control voltage pairs of wires may be connected to the synchronizing voltage bus in the proper relationship so that phase 2 will be lagging phase 1 by 120°.

By referring to the waveform of FIG. 7 it will be noted that a positive-going pulse 41-1 will appear across the load resistor 41 which will gate the thyratron T3 into conduction. Before this pulse drops to zero another positive going pulse 42-1 will be generated across load resistor 42 following the first pulse by 120°, which will gate thyratron T4 into conduction in a similar manner. Under these conditions it is assumed that the control voltage is adjusted to zero so that maximum output voltage will result from each of the respective reset magnetic amplifiers 47 and 48. When a positive-going pulse appears on line 3 it cannot be rectified, neither can it pass through the load, since it is blocked by each of the rectifiers T3 and T4, consequently it is nonexistent. Some time thereafter when the 41-1 pulse in the negative-going direction would have returned to zero a complete cycle has elapsed and we have arrived at time 2 pi in the development of the waveform.

At the beginning of this next cycle a reoccurrence of the waveforms in the first cycle occurs, which, in this case, are represented as 41-2 and 42-2, but along with each of these negative-going pulses also appear, which are represented as 43-2 and 44-2. These latter pulses are effective to cancel the pulses on the positive-going side of the zero reference line and therefore no output voltage exists across the load. The feedback magnetic amplifiers 49 and 50 are effective to produce these pulses in a similar manner in which they were produced in the former discussion concerning these units.

Turning to FIG. 8 it will be noted the same general train of pulses exist, except in this case, gating occurs at some point within each half cycle period, consequently the average voltage across the load will be reduced.

In both waveforms of FIGS. 7 and 8 it will be noted that the solid line represents pulses which occur at 1/30 second intervals or at a frequency of 30 cycles. One difference that might be pointed out between these waveforms and those of FIGS. 5 and 6 is that the voltage pulses within any cycle are more closely grouped. This phenomena may be of some advantage for certain applications, particularly if a more uniform output is desired during any one pulse interval. One advantage which might result from this is that less filtering apparatus would be required in the event such filtering is at all necessary. The main advantage of the three phase system appears to be in the elimination of an input transformer aside from the direct application to a three phase power source when it is available.

Having described this electronic power supply for adapting the power source frequency to half frequency, particularly where vibrating loads are encountered, as one specific embodiment of this invention, I desire it to be understood that various adaptations, modifications, and alterations may be made to the specific form shown to meet the requirements of practice without in any manner departing from the spirit or scope of this invention.

What I claim is:

1. In a combination with an alternating current source of energy, a full wave gatable rectifying means, a first pair of saturable reactors connected to the alternating current source for partially controlling the gating of said rectifying means, a second pair of saturable reactors connected to the alternating current source and each having a feedback circuit connected to its respective input and output such that only alternate half cycles occur in the output for partially controlling the gating of said rectifying means, synchronizing means operatively connected to the inputs of both pairs of saturable reactors for maintaining proper time sequence of outputs from both pairs of saturable reactors, circuit means connecting in series opposition the output of each of said first pair of saturable reactors with the output of each of said second pair of saturable reactors and to the gatable rectifying means during each half cycle of said full wave rectifying means, thereby providing a voltage output in each alternate cycle of said source frequency.

2. A power supply for operation from a multi-phase source of energy comprising gatable rectifying means for rectification of said source voltage in a plurality of said phases, first saturable reactor means of the resettable voltage sensitive type electrically connected to the source of energy for gating each of said gatable rectifying means, second saturable reactor means of the resettable voltage sensitive type electrically connected at its input to the source of energy and including feedback means electrically connecting operatively its input and output thereby eliminating alternate cycles of energy and for gating each of said gatable rectifying means, circuit means for connecting the outputs of said first saturable reactor means and said second saturable reactor means in series to effectively control each of said rectifying means, phasing means connecting operatively the source of energy to the inputs of the first and second pairs of saturable reactor means for synchronizing pairs of said first and second saturable reactor means so that successive phase pulses are synchronized at definite time points during alternate half cycle periods and the cancellation effect of said second saturable reactor means will be effective during intermediate half cycle periods to produce a half frequency voltage with respect to the input frequency of said power source of energy.

3. In a combination with a three phase source of energy, a gatable rectifying means connected in series with each of two phases, a load means connected in series with the other phase of said three phase energy source, of a first pair of saturable reactors of the resettable voltage type electrically connected operatively to said two phases for partially controlling the gating of said rectifying means, a second pair of saturable reactors electrically connected operatively to said two phases and having a feedback circuit the output voltage of which is dependent upon the storage capability of a capacitor, said capacitor being effective to cancel intermediate voltage pulses of said power frequency by proper polarity connection to the inputs of said second pair of saturable reactors, synchronizing means operatively connected to the inputs of said first and second pair of saturable reactors for maintaining the output pulses of the saturable reactors at a phase angle of 120°, circuit means connecting the gatable rectifying means to the output of each of said first pair of saturable reactors to each of said second pair of saturable reactors and connecting the output of each of said first and second pair of saturable reactors in series opposition to produce a voltage output across said load during alternate cycles only with respect to the frequency of said source of energy.

4. In a combination comprising a polyphase power source gatable rectifying means connected in series with certain of said plurality of phases, load means connected in series with certain other phases not including said rectifying means, first saturable reactor means electrically connected operatively to the power source and gatable within itself to control its output voltage over any half cycle period, second saturable reactor means electrically connected operatively to the power source and including feedback means electrically connected operatively to its input to control its output voltage by eliminating alternate half cycles, circuit means to connect the output of said first saturable reactor means and said second saturable reactor means in series opposition for controlling the gating of said rectifying means in each phase wherein said rectifying means are inserted, synchronizing means connected to the inputs of the first and second saturable reactor means to maintain each of said first and second saturable reactor means in synchronism and applied to all said saturable reactors controlling the pulses of energy within any half cycle period of the frequency of said power source thereby attaining a unipolar pulsed voltage during alternate half cycle periods of said energy source.

5. A power supply adapted to be operated from an alternating voltage power source of a certain frequency, comprising a first means electrically connected operatively to the power source effective to provide fullwave rectification of said power source voltage during each cycle thereof, a second means electrically connected operatively to the power source effective to provide a unidirectional output voltage during alternate cycles of the power source voltage, circuit means including said first means and an output of the second means connected electrically in opposing relationship and operative to nullify the fullwave rectification at the output of said first means during said same alternate cycles of the power source voltage, thereby producing at the output of the first means a voltage at half the frequency of said power source voltage.

6. A power supply as claimed in claim 5 having means electrically connected to said first means effective to control the time during every half cycle of said source voltage in which current flows at the output of said first means, thereby controlling the average current of said half frequency output.

7. A power supply according to claim 5 having synchronizing means electrically connecting operatively said source voltage to said first and second means effective to maintain a predetermined phase relationship between said first and second means.

8. A power supply according to claim 7 wherein means are electrically connected to said synchronizing means effective to control the time of conduction of said first means during every half cycle to control the average current of said half frequency output.

9. A power supply adapted to be operated from an alternating source of energy, comprising a first pair of saturable reactors electrically connected operatively to the source of energy to provide an output voltage during each cycle of said source voltage, a second pair of saturable reactors electrically connected operatively to the source of energy to provide an output voltage during each alternate cycle of said source voltage, a pair of gatable rectifiers electrically connected to said source voltage, and circuit means connected to outputs from said first and second pair of saturable reactors connected in series opposition and also connected to said pair of gatable rectifiers to cause said gatable rectifiers to provide fullwave rectification of said source voltage during the alternate cycles of said source voltage when said second pair of saturable reactors is not providing an output, thereby producing a voltage output from said power supply at half the frequency of said source of energy.

10. A power supply operable from an alternating current source of energy, comprising an input transformer having a primary winding electrically connected to said source of energy and a center-tapped secondary winding, a pair of gatable rectifiers connected in push-pull arrangement each in series commonly with a load across each half of said secondary winding, a first pair of saturable reactors electrically connected to the source of energy to provide an output control effective to gate said gatable rectifiers on every cycle of said source of energy, a second pair of saturable reactors electrically connected to the source of energy, and each having a feedback means electrically connected to their respective inputs for providing output control effective to gate said gatable rectifiers on every alternate cycle of said source of energy, circuit means electrically connecting operatively the pair of gatable rectifiers to the outputs of each of said pairs of saturable reactors and connecting the outputs of the first and second pairs of saturable reactors in series opposition for cancelling the output from said first and second pair of saturable reactors during every alternate cycle for effectively providing an output only from said first pair of saturable reactors during the intervening alternate cycle, thereby providing an output from said power supply at half the frequency of said source of energy.

11. A frequency dividing circuit comprising; a single phase source of alternating current; a pair of gatable discharge devices each having an anode, a cathode, and a gating electrode, said cathodes being electrically connected commonly, an input transformer having a primary winding electrically connected across said alternating current source and having a center-tapped secondary winding, each of the extreme opposite terminals of which are electrically connected to each of said anodes of said discharge devices; a load impedance electrically connected from the center-tap of said secondary winding to the common cathode connection of said discharge devices; a first pair of resistive elements one end of each being electrically connected to the gating electrodes of said respective discharge devices; a second pair of resistive elements one end of each being electrically connected to the other end of each of said respective first pair of resistive elements and the other end of each of said second pair being electrically connected commonly; a source of D.C. potential, the positive pole of which is electrically connected to said common cathode terminal, and the negative pole of which is electrically connected to said other end of said commonly connected second pair of resistive elements; a first pair of magnetic amplifiers each having an input electrically connected to the source of alternating current and each having an output electrically connected across a respective one of said first pair of resistive elements for providing a voltage thereacross to gate said pair of discharge devices at any point during every successive half cycle when said respective discharge devices have positive-going pulses applied to their anodes; a second pair of magnetic amplifiers each having an input electrically connected to the source of alternating current and each comprising a feedback means electrically connected to its respective inputs and having an output each of which is electrically connected across a respective one of said second pair of resistive elements for providing a voltage thereacross in opposition to said voltage provided by said first pair of magnetic amplifiers to cancel said voltages on every alternate cycle of said source as governed by said feedback means, thereby providing an output across said load impedance having a frequency equal to one-half the frequency of said alternating current source.

12. A claim according to claim 11 wherein said magnetic amplifiers each have a primary and secondary circuit and said amplifiers comprise, synchronizing means electrically connected to a predetermined phase in a predetermined phase relationship for supplying a voltage within the primary and secondary circuits of said magnetic amplifiers such that each of said first pair is in 180° relationship to each of said second pair, and wherein said feedback means includes a resistive element connected in the output circuit of said second pair of magnetic amplifiers for providing a voltage thereacross, a series connected capacitance and unidirectional current conducting device electrically connected across said last named resistive element for storing the voltage developed across said last named resistive element, circuit means electrically connected across said capacitive element to transfer said stored voltage to the input circuit of said second pair of magnetic amplifiers thereby providing a voltage in opposition to a predetermined polarized voltage in said primary circuit supplied by said synchronizing means.

13. A frequency dividing phase conversion circuit comprising, a three phase source of alternating current having three terminals, a pair of gatable discharge devices each having an anode, a cathode, and a gating electrode, said cathode being electrically connected commonly and each of said anodes being electrically connected to a respective one of two of said terminals, a load impedance electrically connected from the third of said terminals to said common cathode connection, a source of D.C. potential the positive pole electrically connected to said common cathode connection, a first pair of resistive elements one end of each being electrically connected to each said gating electrode of the discharge devices, a second pair of resistive elements one end of each being electrically connected to each of said first pair of resistive elements and the other end of each being electrically connected to the negative terminal of said D.C. potential source, a first pair of magnetic amplifiers electrically connected operatively to two phases of the alternating current source and each having an output electrically connected across a respective one of said second pair of resistive elements for providing a voltage thereon to gate said pair of discharge devices at any point within every successive half cycle when said discharge devices have positive-going pulses applied to their respective anodes, a second pair of magnetic amplifiers electrically connected operatively to said two phases of the alternating current source and each having a feedback means electrically connected to its respective input including a resistive element in the output circuit of said second pair of magnetic amplifiers for providing a voltage thereacross, a series connected capacitance and unidirectional current conducting device electrically connected across said last named resistive element for storing only one polarity of the voltage developed thereacross, circuit means electrically connected across said capacitance to transmit said stored voltage to said primary circuit of said second pair of magnetic amplifiers for providing a feedback voltage effective to cancel the output voltage from said second pair of magnetic amplifiers on alternate cycles, and said second pair of magnetic amplifiers also having said output electrically connected across each of said first pair of resistive elements respectively for providing a voltage thereacross in accordance with said feedback means effective to cancel said combined voltages during every alternate cycle in two of said three phases only, thereby providing an output across said load impedance having a frequency equal to half the frequency of said alternating current source and including but two of said three phases.

References Cited in the file of this patent

UNITED STATES PATENTS

| | | |
|---|---|---|
| 2,493,575 | Edwards | Jan. 3, 1950 |
| 2,591,114 | Anderson | Apr. 1, 1952 |
| 2,925,546 | Berman | Feb. 16, 1960 |